United States Patent [19]

Dreibholz et al.

[11] Patent Number: 6,081,760
[45] Date of Patent: Jun. 27, 2000

[54] ERROR RECOGNITION PROCESS FOR AUTOMATIC GEAR BOXES TRANSMISSION

[75] Inventors: Ralf Dreibholz, Meckenbeuren; Gerd Frotscher; Kai Staiger, both of Friedrichshafen, all of Germany

[73] Assignee: ZF Friedrichshafen AG, Friedrichshafen, Germany

[21] Appl. No.: 08/983,242

[22] PCT Filed: Jul. 20, 1996

[86] PCT No.: PCT/EP96/03209

§ 371 Date: Jan. 9, 1998

§ 102(e) Date: Jan. 9, 1998

[87] PCT Pub. No.: WO97/05409

PCT Pub. Date: Feb. 13, 1997

[30] Foreign Application Priority Data

Jul. 27, 1995 [DE] Germany ............................ 195 27 414

[51] Int. Cl.⁷ .................................................. F16H 61/12
[52] U.S. Cl. ............................................... 701/62; 701/29
[58] Field of Search ................................. 701/29, 62, 63, 701/64; 477/34, 97

[56] References Cited

U.S. PATENT DOCUMENTS

| | | | |
|---|---|---|---|
| 4,611,507 | 9/1986 | Burkel et al. ............................ | 477/154 |
| 5,129,287 | 7/1992 | Asada et al. ............................. | 74/866 |
| 5,142,945 | 9/1992 | Shimanaka ............................... | 74/866 |
| 5,182,969 | 2/1993 | Goto et al. ............................... | 74/866 |

FOREIGN PATENT DOCUMENTS

| | | |
|---|---|---|
| 0 436 977 B1 | 7/1991 | European Pat. Off. . |
| 0 719 967 A1 | 7/1996 | European Pat. Off. . |
| 32 05 767 C2 | 8/1983 | Germany . |
| 2 213 220 | 8/1989 | United Kingdom . |

*Primary Examiner*—Michael J. Zanelli
*Attorney, Agent, or Firm*—Davis and Bujold

[57] ABSTRACT

The invention concerns a method of monitoring the gearshift process in an automatic transmission. In order to be able to recognize fault conditions, the invention proposes in one embodiment that the actual change in transmission ratio is compared with a required change in transmission ratio. In another embodiment the change in the difference in the speed of the rotation of the engaging shift element is examined. It is also possible to analyze the gradient of the difference in the speed of rotation of the engaging shift element. A further possibility is to monitor the gradient of the transmission input speed. In addition, the gradient of the speed at the transmission output can be monitored. As result of the analysis, the transmission ratio is either retained or a predetermined safety condition is brought about.

2 Claims, No Drawings

ERROR RECOGNITION PROCESS FOR AUTOMATIC GEAR BOXES TRANSMISSION

The invention relates to a method for monitoring a gearshift process, in particular that of an automatic transmission, where a (disengaging) gearshift element belonging to a first transmission ratio is opened, and an (engaging) shift element belonging to another transmission ratio is closed.

BACKGROUND OF THE INVENTION

In exclusively electronically controlled powershift transmissions, after a load take up by the engaged gearshift element, it must be checked whether the disconnected gearshift element has also reliably disengaged. This can be done by monitoring the slip that occurs on the old gearshift element. The slip is calculated according to a turbine speed and an output speed. If, after a certain period of time, no slip results after the switching torque has been impressed on the shift element to be engaged, the old gear is retained in order to prevent a blockage of the transmission (EP-A 0 436 977).

For adjusting the hydraulic pressure in a shift element of an automatic transmission, DE-A 32 05 767 has disclosed a method in which the input speed and the output speed of the transmission are determined, and the pressure is adjusted so that the reduction ratio of the transmission during a change of gear follows a preset time function. The whole shifting operation preferably takes place in two steps wherein the pressure is controlled up to a free-wheel point, that is, the point at which the friction elements coordinated with the old gear disengage, and thereafter follows the regulation to a preset reduction ratio or a change of the reduction ratio. If the free-wheel point in the transmission is not reached, a time control ensures that the pressure is raised in a ramp-like manner until reaching the free-wheel point.

The effects upon the output torque, which result when the old shift element does not disengage, in particular are the following:

During a high engine torque, there is the danger of the torque on the transmission output falling to a very low value. This effect is especially negative, for example, in the case of an overtaking operation where the full engine power is needed or expected. During a slight engine torque, there results, instead of a positive traction torque, a substantially equally strong thrust torque. Especially on a smooth road, this could lead to the blocking of the wheels at least when the full pressure would be given to the shift element to be engaged in case the time step is exceeded.

SUMMARY OF THE INVENTION

This invention is based on the problem of indicating ways by which it is possible to check, during a gearshift, whether the old shift element to be disengaged has reliably opened and the new shift element to be engaged has reliably closed.

Other features essential to the invention and the advantages resulting therefrom are to be understood from the description that follows of several methods for the solution of the stated problem.

DESCRIPTION OF THE PREFERRED EMBODIMENT(S)

In a first method, the start of a gearshift operation is established by comparing the actual change in transmission ratio ($i=n_{an}/n_{ab}$ of the transmission) with a stored, gear-dependent, required change in the transmission ratio. In case of divergences that are outside a tolerance band, a fault condition is detected. The actual transmission ratio is here determined from the ratio of the input and output speeds of the transmission parts to be engaged. The required change in transmission ratio results as a function of the actual transmission ratio, of the transmission ratio of the new gear and the time.

In another method, according to the invention, the difference in the speed of rotation on the new shift element is monitored. The start of a gearshift is established by comparing the change of the actual difference in the speed of rotation on the new shift element with a required change of difference in the speed of rotation. In the case of divergences which are outside a tolerance band, a fault condition is detected. The actual difference in the speed of rotation is determined from the difference between the speed of rotation of the transmission input and the speed of rotation of the transmission output multiplied by the transmission ratio of the new gear. The required change in difference of the speed of rotation results as a function of the actual speed of rotation of the transmission output or the actual speed of rotation of the transmission input, the transmission ratio of the actual gear, the transmission ratio of the new gear, and the time.

Another method likewise related to the difference in the speed of rotation of the new shift element stands out by the fact that the gradient of the actual change of the difference in the speed of rotation on the new shift element is compared with a required gradient. In case of divergences outside a tolerance band, a fault condition is detected. The gradient of the actual difference in the speed of rotation on the new shift element is determined from the difference of two consecutive values of the actual difference in the speed of rotation divided by the expired testing time. An added dynamic filtering can be used here. The actual difference in the speed of rotation is determined from the difference of the transmission input speed and the transmission output speed multiplied by the transmission ratio of the new gear. The change of the required gradient of the difference in the speed of rotation results as a function of the actual transmission output speed or the actual transmission input speed, the actual transmission ratio of the new gear, and the time.

Instead of the difference in speeds of rotation, the input speed or the output speed of the transmission can also be used, as shown by the other methods according to the invention.

In a method in which the gradient of the input speed of the transmission is monitored, at the start of a gearshift, the gradient of the transmission input speed is compared with a required gradient. In the case of divergences beyond a certain range, a fault condition is detected. The gradient of the input speed of the transmission is determined from the difference between two consecutive values of the actual speed of rotation on the transmission input divided by the expired testing time, optionally with added dynamic filtering. The change of the actual gradient of the speed of rotation of the transmission input results as a function of the actual speed of rotation of the transmission input, the transmission ratio of the actual gear, the transmission ratio of the new gear, and the time.

If, according to another method of the invention, the gradient of the speed of rotation of the transmission output is monitored and said gradient is compared with a required gradient. In the case of divergences beyond a certain range, a fault condition is detected. The gradient of the speed of rotation of the transmission output is determined from the difference between two consecutive values of the actual speed of rotation on the transmission output divided by the expired testing time, optionally with added dynamic filtering.

The change of the required gradient in the speed of rotation of the transmission output results as a function of the actual speed of the transmission output, of the transmission ratio of the actual gear, of the transmission ratio of the new gear, the engine load, and the time.

The skilled person has available other solutions in which the above described methods are at least partly combined with each other.

In all the solutions proposed, as a reaction to the detection of a fault condition, either the transmission is shifted to the old gear or converted to a present safety condition.

We claim:

1. A method for monitoring a gearshift process of a transmission in which a disengaging shift element, belonging to a first transmission ratio, disengages and an engaging shift element, belonging to a second transmission ratio, engages, said method comprising the steps of:

determining an actual change in a difference in a speed of rotation of the engaging shift element with a required change at a start of the gearshift process, wherein the difference in the speed of rotation is determined from a difference in a speed of rotation of a transmission input and of a speed of rotation at a transmission output, multiplied by a transmission ratio of a new gear to be engaged, and the required change in the difference in the speed of rotation is compared as a function of an actual speed of rotation of at least one of the transmission input and the transmission output, a current and new transmission ratio, and a time; and detecting a fault condition when the comparison of the actual change in the difference in the speed of rotation of the engaging shift element diverges from the required change by a predetermined band, whereupon at least one of the first transmission ratio is retained and a predetermined tolerance safety condition is brought about.

2. A method for monitoring a gearshift process of a transmission in which a disengaging shift element, belonging to a first transmission ratio, disengages and an engaging shift element, belonging to a second transmission ratio, engages, said method comprising the steps of:

comparing, at a start of a gearshift process, a gradient of an actual change in difference in a speed of rotation of the engaging shift element with a required change in a gradient of a difference in the speed of rotation, wherein the gradient of the actual change of the difference in the speed of rotation is determined by a difference of two consecutive values of the actual difference in the speed of rotation divided by an expired testing time, and the existing actual difference in the speed of rotation is determined from a difference in speed of rotation of the transmission input multiplied by a transmission ratio of a new gear to be engaged, and the required change of the gradient of the difference in the speed of rotation is compared as a function of at least one of an actual speed of rotation of the transmission input and the transmission output, a current and new transmission ratio, and a time; and detecting a fault condition when the comparison of the gradient of the actual change in difference in the speed of rotation of the engaging shift element diverges from the required change in the gradient by a predetermined band, whereupon at least one of the first transmission ratio is retained and a predetermined tolerance safety condition is brought about.

* * * * *